United States Patent [19]

Berg

[11] 4,450,412
[45] May 22, 1984

[54] BALANCED AMPLIFIER OUTPUT STAGE

[75] Inventor: Bengt O. Berg, Solna, Sweden

[73] Assignee: Telefonaktiebolaget L M Ericsson, Stockholm, Sweden

[21] Appl. No.: 227,082

[22] PCT Filed: Apr. 21, 1980

[86] PCT No.: PCT/SE80/00114
§ 371 Date: Jan. 4, 1981
§ 102(e) Date: Dec. 23, 1980

[87] PCT Pub. No.: WO80/02488
PCT Pub. Date: Nov. 13, 1980

[30] Foreign Application Priority Data

May 4, 1979 [SE] Sweden ............................. 7903931

[51] Int. Cl.³ ........................... H03F 3/45; H03F 3/26
[52] U.S. Cl. ..................................... 330/255; 330/261; 330/267
[58] Field of Search ............... 330/253, 255, 258, 259, 330/261, 262, 267

[56] References Cited

FOREIGN PATENT DOCUMENTS 1189589 11/1963 Fed. Rep. of Germany ...... 330/262

Primary Examiner—James B. Mullins
Assistant Examiner—G. Wan
Attorney, Agent, or Firm—Roberts, Spiecens & Cohen

[57] ABSTRACT

A balanced amplifier output stage preferably intended to be used in a telephone instrument and which has its current supply from the telephone line includes two transistor amplifiers connected to parallel each having a top (T1, T2) and a bottom (T3, T4) transistor with series connected emitter-collector-circuits. Equally located transistors (e g T1, T2) in the series connections are driven in push-pull. To stabilize the current sum (I) passing through the two transistor amplifiers (T1, T3; T2, T4) connected in parallel there is a regulation circuit (T5) which compares the current sum (I) with a reference quantity (Vref) and feeds a correction signal in equal phase inputs of the amplifiers connected in parallel.

6 Claims, 1 Drawing Figure

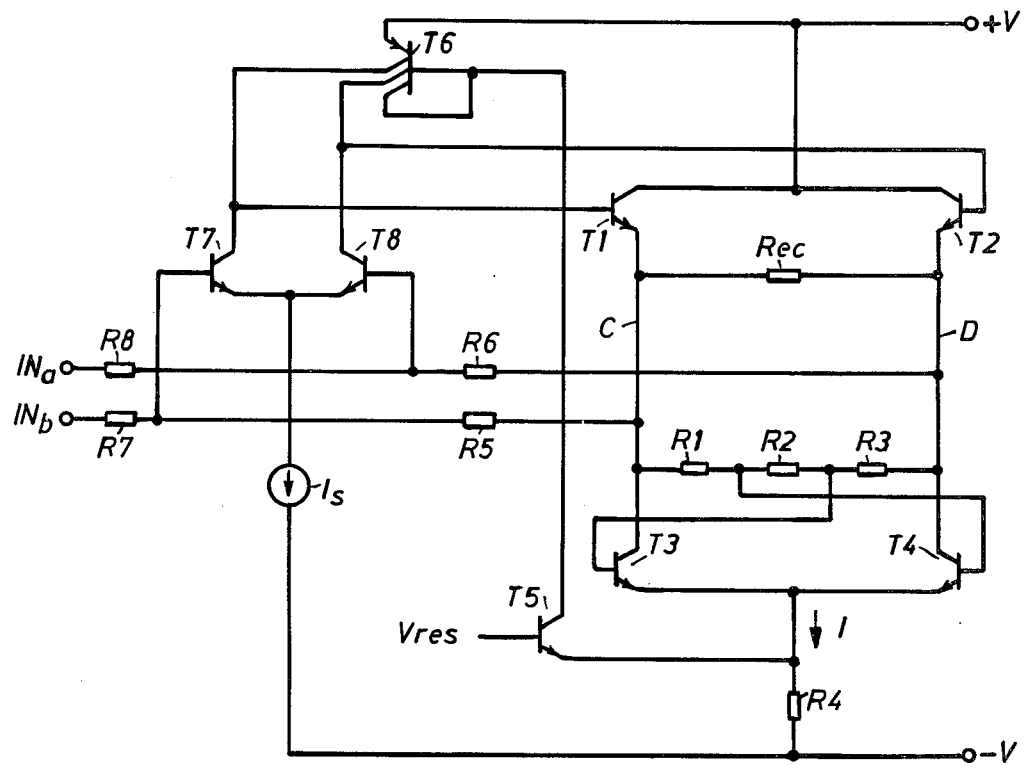

BALANCED AMPLIFIER OUTPUT STAGE

FIELD OF THE INVENTION

The present invention relates to a balanced amplifier output stage preferably intended to be used as a receiver amplifier in telephone instruments.

DESCRIPTION OF PRIOR ART

An output stage of a receiver amplifier in a telephone instrument should be so constructed that it can work with high efficiency even when the line voltages are low. It is for example known through Texas Instruments Application Report B107, Audio Amplifier design Bedford 1971 p 36, 37 and 39 to use a bridge connection with two series connected transistors as an amplifier output stage where the load is connected between the mid-points of the two series connections. The transistors are operated in push-pull in such a way that during half a semi-cycle the current goes through the top transistor in one series connection and the bottom transistor in the other series connection, while it during the reverse semi-cycle passes through the top transistor in the second series connection and the bottom transistor in the first series connection. The output obtained will therefore be considerably greater as the effective voltage deviation across the load will in principle be twice as great as in a single output stage of a so called "single ended push-pull" type.

SUMMARY OF THE INVENTION

The amplifiers described above present a relatively low impedance towards the current supply source. In normal audio amplifiers this does not imply an problem as the current supply source has a very low impedance, for example by being shunted with a high capacitance. If a known amplifier should be used as a receiver amplifier in a telephone instrument the current supply will take place through the subscriber's line which has a considerable impedance. There is then a great risk that the line current varies according to the signal causing a undesired feed-back which can lead to self-oscillation.

A balanced receiver amplifier according to the invention includes two transistor amplifiers connected in parallel, each one including two transistors with series connected emitter collector circuits where the load is connected between the common points of the series connected emitter collector circuits and where equally located transistors in both amplifiers are fed with input signals in push-pull characteristics of the invention appear from the attached claims.

By the circuit according to the invention an amplifier is obtained which utilizes the entire available voltage at the same time as it takes a constant current from the source so that the feed voltage is kept constant independent of the internal impedance of the current supply source. Moreover the dc-level of the amplifier will be well defined.

BRIEF DESCRIPTION OF THE DRAWINGS

The invention will be described more in detail in connection with the accompanying drawing showing a driving and an output stage in a receiver amplifier.

PREFERRED EMBODIMENT

In the FIGURE T1, T2, T3 and T4 denote four transistors which form two push-pull arranged amplifier stages T1, T3 and T2, T4 respectively which are connected in parallel and driven in push-pull. The Load Rec is connected between the common points C and D for the two transistors in the stages T1, T3 and T2, T4 respectively. As the circuit is intended to be designed as a monolitic integrated circuit all the transistors T1–T4 are of npn-type. However, it is naturally possible to use other known combinations of transistors in the push-pull stages. The output stage is driven by a differential input stae T7, T8, the base circuits of which are connected to a signal input INa, INb through the resistors R7, R8. The emitters of the differential stage are as usual connected to a constant current source Is which is schematically drawn but can consist of some transistor circuit known per se. The collector side in the differential amplifier T7, T8 is connected partly to the bases of the transistors T1 and T2 and to the terminal +V of a single voltage source through two of the collectors and the emitter of transistor T6 connected as a current mirror. A third collector in the transistor T6 connected to the base thereof, is also connected to the negative terminal pole −V through a series transistor T5 controlled by a reference voltage Vref and an emitter resistance R4 common to the transistors T3 and T4 in the output amplifier. The push-pull input signals to the transistors T3 and T4 are received from a voltage divider R1, R2, R3 connected between the points C and D. The base of the transistor T3 is connected to the common point between resistor R2 and R3 whereas the base of the transistor T4 is connected to the common point between the resistors R1 and R2. The points C and D are also connected to the base circuits in the transistors T7 and T8 through the feed back resistors R5 and R6.

The circuit operates in the following way. A balanced signal applied to the inputs INa and INb is amplified in the differential amplifier T7, T8 and fed in a balanced way to the base circuits in the transistors T1 and T2 in the output amplifier stage. The operating point for these transistors T1 and T2 is determined by the transistor T6 connected as a current mirror where two collectors supply base current to the transistors T1 and T2. The Load Rec connected between the emitters in the transistors T1 and T2 does not carry any current in case the emitter voltages are alike. The bottom transistors T3, T4 receive the base current feed from the emitter circuit in the opposite top transistor T2 and T1 respectively through the resistor network R1, R2, R3.

An incoming signal which for example makes the transistor T1 more conducting than transistor T2 means that also the transistor T4 becomes more conducting than T3 and a current will pass through the Load Rec. When the signal polarity is the reverse on the bases of the transistors T1 and T2 the direction of current through the Load is the reverse.

The sum of the currents through the transistors T3 and T4 flows through the resistor R4. As long as the balance in the amplifier is perfect the voltage is not altered across the resistance R4 with the signal.

An increasing current through one of the transistors for example T3 corresponds to an identical current decrease through the transistor T4. If, however, the balance is not perfect, which is the case in integrated circuits which are not specially trimmed, a so called common mode signal will flow to the current source. If the impedance of the current source is high, which is the case when a telephone instrument amplifier sets its current supply through the telephone line, the voltage of the supply point will be modulated and there is a risk that the amplifier becomes unstable.

The direct current sum through the resistor R4 can also vary for example with the temperature, as the whole amplifier is DC connected. A small voltage alteration in an early stage is amplified and can cause that the current through R4 is altered.

To stabilize for these signal- and direct current alterations, the voltage across the resistor R4 is compared with a reference voltage Vref in the transistor T5, the collector current of which is brought to vary with the current through R4. If for example the current through R4 decreases the base current and accordingly the collector current in the transistor T5 increases. Also the emitter current in the transistor T6 increases and accordingly the two collector currents increase to the same extent. The base currents in the two transistors T1 and T2 increase and causing the current sum through the resistance R4 to be restored to the value determined by the reference voltage Vref.

A stabilization of the differential amplification and the operating point is obtained through the symmetrical feed-back from the points C and D in the output stage to the inputs of the amplifier stage T7, T8.

What we claim is:

1. A current stabilized balanced amplifier comprising: a source of operating voltage having first and second terminals; first and second output amplifiers connected in parallel, each of said amplifiers comprising first and second transistors with emitter-collector paths serially connected, in each amplifier junction means at junction of the emitter of one of the transistors and the collector of the other transistor; a load connected between said junction means; first connecting terminal means for connecting the collectors of said first transistors to the first terminal of said source of operating voltage; second connecting terminal means for connecting the emitters of said second transistors to the second terminal of said source of operating voltage; one of said connecting terminal means including sensing means for sensing the sum of the current passing through said output amplifiers; regulating means for controlling the current passing through said output amplifiers; and control means including a representation of a reference current and responsive to said sensing means for controlling the operation of said regulating means to control the sum of the current to a given constant value directly related to the value of the referred current and thereby fixing a constant operating point for said output amplifiers.

2. The stabilized balanced amplifier of claim 1 wherein said regulating means comprises a constant current source having a control input means and controlled output means, balanced means for connecting the controlled output means to the bases of the first transistors of said amplifiers, and means connecting said control means to said control input means.

3. The stabilized balanced amplifier of claim 2 wherein said balanced means comprises a balanced amplifier means having first and second transistors, the collectors of said transistors being connected to said controlled output means and the bases of the first transistors of said amplifiers, means for connecting the emitters of said transistors to said source of operating voltage, and the bases of said transistors being adapted to receive an input signal.

4. The stabilized amplifier of claim 3 wherein said control means comprises a control transistor having an emitter connected to the junction of said sensing means and said output amplifiers, a base connected to a reference voltage, and a collector connected to the controlled input means of said constant current source.

5. The stabilized amplifier of claim 4 wherein said constant current source is a multicollector transistor in a current mirror configuration, a pair of collectors of said multicollector transistor being connected to the respective collectors of the transistors of said balanced amplifier means, and the base of said multicollector transistor being connected to the collector of said control transistor.

6. The stabilized balanced amplifier of claim 1, 2, 3, 4, or 5 further comprising means for connecting the base of the second serially connected transistor of one of said output amplifiers to the emitter of the first serially connected transistor to the other of said output amplifiers.

* * * * *